United States Patent [19]

Suzuki

[11] 4,399,528

[45] Aug. 16, 1983

[54] AUTOMATIC EJECT APPARATUS FOR A SELF-CONTAINED RECORD PLAYER

[75] Inventor: Kiyoshi Suzuki, Tokyo, Japan

[73] Assignee: Sony Corporation, Tokyo, Japan

[21] Appl. No.: 334,262

[22] Filed: Dec. 24, 1981

[30] Foreign Application Priority Data

Dec. 29, 1980 [JP] Japan .............................. 55/186552

[51] Int. Cl.³ .......................... G11B 1/00; G11B 17/00
[52] U.S. Cl. ........................................ 369/77; 369/75; 369/244; 312/8
[58] Field of Search ...................... 369/75.1, 75.2, 213, 369/244, 258, 77

[56] References Cited

U.S. PATENT DOCUMENTS

| | | | |
|---|---|---|---|
| 2,358,917 | 9/1944 | Emde | 369/9 |
| 2,441,893 | 5/1948 | McKee | 369/244 |
| 2,475,744 | 7/1949 | Harman | 369/244 |
| 2,608,456 | 8/1952 | Barth | 312/8 |

Primary Examiner—Steven L. Stephan
Assistant Examiner—Hezron Williams
Attorney, Agent, or Firm—Lewis H. Eslinger; Alvin Sinderbrand

[57] ABSTRACT

Automatic eject apparatus is provided for a self-contained record player, that is, a record player of the type having a housing, a carrier movable into and out of the housing, a turntable mounted on the carrier and a tone arm pivotably supported on the carrier and movable between raised and lowered positions. An energizable carrier drive bi-directionally drives the carrier into and out of the housing between withdrawn and retracted positions, respectively. Sensors sense when the carrier is in its withdrawn and retracted positions, and a tone arm position detector detects when the tone arm is in its raised and lowered positions, respectively. A tone arm drive is energizable to pivotally drive the tone arm to and from a reset position. When an eject switch is operated, drive control circuitry responds thereto to energize the carrier drive in accordance with the position sensed by the sensors whereby the carrier is driven into the housing when the sensors sense that the carrier is in its withdrawn position, and the carrier is driven out of its housing when the sensors sense that the carrier is in its retracted position and that the tone arm position detector detects that the tone arm is in its raised position. The drive control circuit concurrently energizes the tone arm drive to pivot the tone arm to its reset position. The carrier thus may be ejected from the housing at any time, even when a playback operation is being performed.

10 Claims, 5 Drawing Figures

AUTOMATIC EJECT APPARATUS FOR A SELF-CONTAINED RECORD PLAYER

BACKGROUND OF THE INVENTION

This invention relates to a record player and, more particularly, to eject apparatus for a self-contained record player of the type having a turntable which is movable into and out of a housing.

In a self-contained record player, a phonograph record may be placed upon or removed from a turntable by ejecting that turntable from its self-contained housing; and a newly-loaded record may be played back by returning the turntable into its housing. Advantageously, record players of this type exhibit relatively small height dimensions such that they can be used in many locations and integrated with other audio equipment which, hitherto, might have been inconvenient. Since the actual record-playing, or playback, operation is carried out within the housing, manual access to the usual tone arm is inhibited. Hence, automatic playback operations are performed, whereby the tone arm automatically is moved to its so-called lead in position and, after the entire record has been played back, the tone arm automatically is returned to its "rest" or reset position. In some self-contained record players, the tone arm may be advanced automatically to a desired one of plural selections on a record and then returned to its reset position after that selection has been played back.

In automatic, self-contained record players of the aforementioned type, an "eject" operation to withdraw the turntable from the housing cannot be performed until and unless the tone arm is returned to its reset position. Thus, if a user wishes to change the record then being played back by the record player, he is prevented from doing so until the remainder of the record, or at least the remainder of the selection then being played, is completed. At that time, the tone arm will be returned automatically to its reset position, and the turntable may be ejected from its housing to permit a change of record.

The aforementioned delay in ejecting the turntable from its housing is inconvenient and, often, highly undesirable. Even if the record player is provided with a "reject" control, whereby the tone arm may be raised automatically from the record and returned to its reset position at anytime in response to the actuation of a reject switch, the turntable still cannot be withdrawn, or ejected, until the tone arm has been fully returned to its reset position. Here too, the delay in ejecting the turntable is undesirable.

OBJECTS OF THE INVENTION

Therefore, it is an object of the present invention to provide automatic eject apparatus for a self-contained record player which avoids the aforenoted disadvantages.

Another object of this invention is to provide improved eject apparatus which is capable of ejecting a turntable from the housing of a self-contained record player quickly, without delaying until the tone arm of that record player returns to its reset position.

A further object of this invention is to provide eject apparatus for a self-contained record player which is capable of ejecting the turntable from the housing thereof, even while a record is in the process of being played back.

Various other objects, advantages and features of the present invention will become readily apparent from the ensuing detailed description, and the novel features will be particularly pointed out in the appended claims.

SUMMARY OF THE INVENTION

In accordance with this invention, eject apparatus is provided for a record player of the type having a housing, a carrier movable into and out of the housing, a turntable mounted on the carrier and a tone arm pivotably supported on the carrier and movable between raised and lowered positions. The eject apparatus includes a carrier drive which is energizable to bi-directionally drive the carrier into and out of the housing between withdrawn and retracted positions, and sensors for sensing when the carrier is in its withdrawn and retracted positions. The apparatus also includes a tone arm drive which is energizable to pivotally drive the tone arm to and from a reset position, and a tone arm position detector for detecting when the tone arm is in its raised and lowered positions, respectively. Drive control circuitry is responsive to the operation of an eject switch to energize the carrier drive in accordance with the position sensed by the sensors, whereby the carrier drive drives the carrier into the housing when the sensors sense that the carrier is in its withdrawn position, and the carrier drive drives the carrier out of the housing when the sensors sense that the carrier is in its retracted position and the tone arm position detector also detects that the tone arm is in its raised position. The drive control circuitry, when energizing the carrier drive, concurrently energizes the tone arm drive to pivot the tone arm to its reset position.

BRIEF DESCRIPTION OF THE DRAWINGS

The following detailed description, given by way of example, will best be understood from the accompanying drawings in which.

DETAILED DESCRIPTION OF A CERTAIN PREFERRED EMBODIMENT

Figure 1:
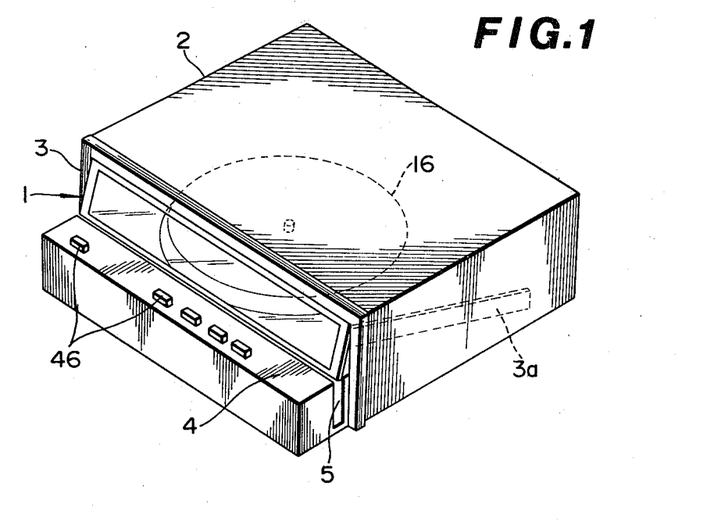
FIG. 1 is a perspective view of a self-contained record player incorporating the present invention, and illustrating the retracted position of the turntable.
Figure 2:
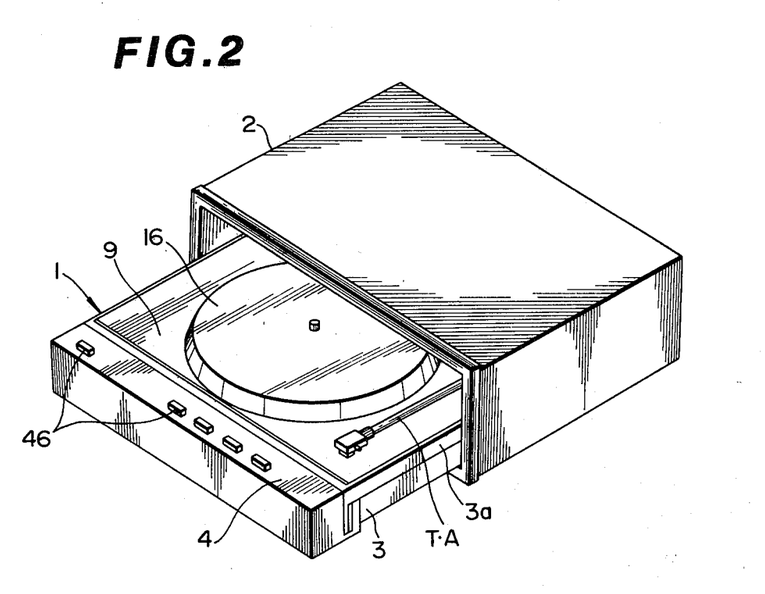
FIG. 2 is a perspective view of the aforementioned self-contained record player illustrating the turntable in its withdrawn position.

Referring now to the drawings, wherein like reference numerals are used throughout, FIGS. 1 and 2 are perspective views of a self-contained record player incorporating the present invention, with FIG. 1 illustrating the turntable in its retracted position and FIG. 2 illustrating the turntable in its withdrawn, or ejected position. The record player is comprised of a carrier 1 which is movable into and out of a housing, or enclosure, 2. The carrier has a turntable 16 rotatably supported thereon to receive a record disc. When carrier 1 is in its retracted position within housing 2, a front cover 3, which is adapted to protect the interior of housing 2, is raised to the position illustrated in FIG. 1. Front cover 3 is secured to a pair of pivot arms 3a, only one of which is illustrated in phantom lines in FIG. 1. When carrier 1 is withdrawn, or ejected, from housing 2, as illustrated in FIG. 2, pivot arms 3a lower front cover 3 into a groove 5 provided on carrier 1 to accommodate the front cover.

A tone arm T-A is pivotally mounted on carrier 1, as will be described below, and is operable when the carrier is in its retracted position to pivot to a lead-in position on a record placed upon turntable 16. In this manner, tone arm T-A is pivoted from a quiescent, or reset, position to bring the stylus thereon into contact with the surface of the record and, thus, play back the sound signals which are recorded in the usual spiral sound groove. Although not shown herein, a mechanical arrangement is provided to raise and lower the tone arm with respect to the surface of the record being placed back thereby.

FIGS. 1 and 2 also illustrate a control panel 4 upon which a plurality of manually operable control switches 46 is provided. These control switches may include, for example, an EJECT switch which is operable to drive carrier 1 into and out of housing 2, a REJECT switch which is operable to raise tone arm T-A from the surface of the record being played back thereby, and various other control switches which are provided to selectively carry out playback operations by the illustrated record player.

Figure 3:
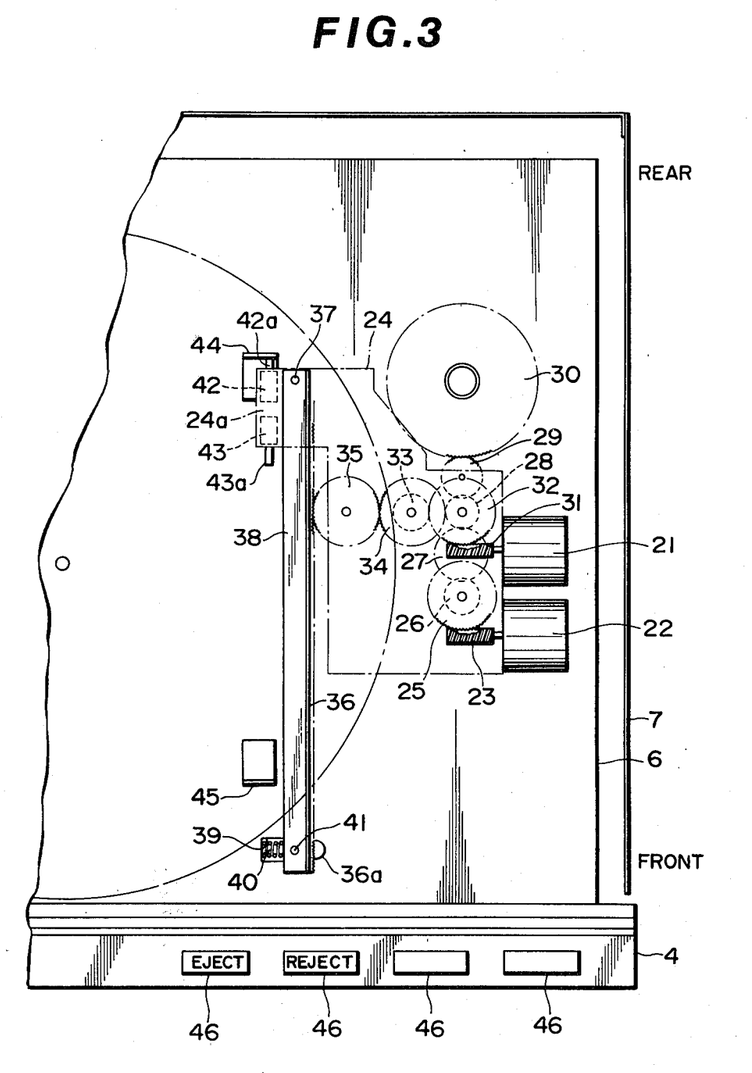
FIG. 3 is a top view of a portion of the drive mechanism which is used to withdraw and retract the turntable out of and into the housing, and also to pivot the tone arm across a record.
Figure 4:
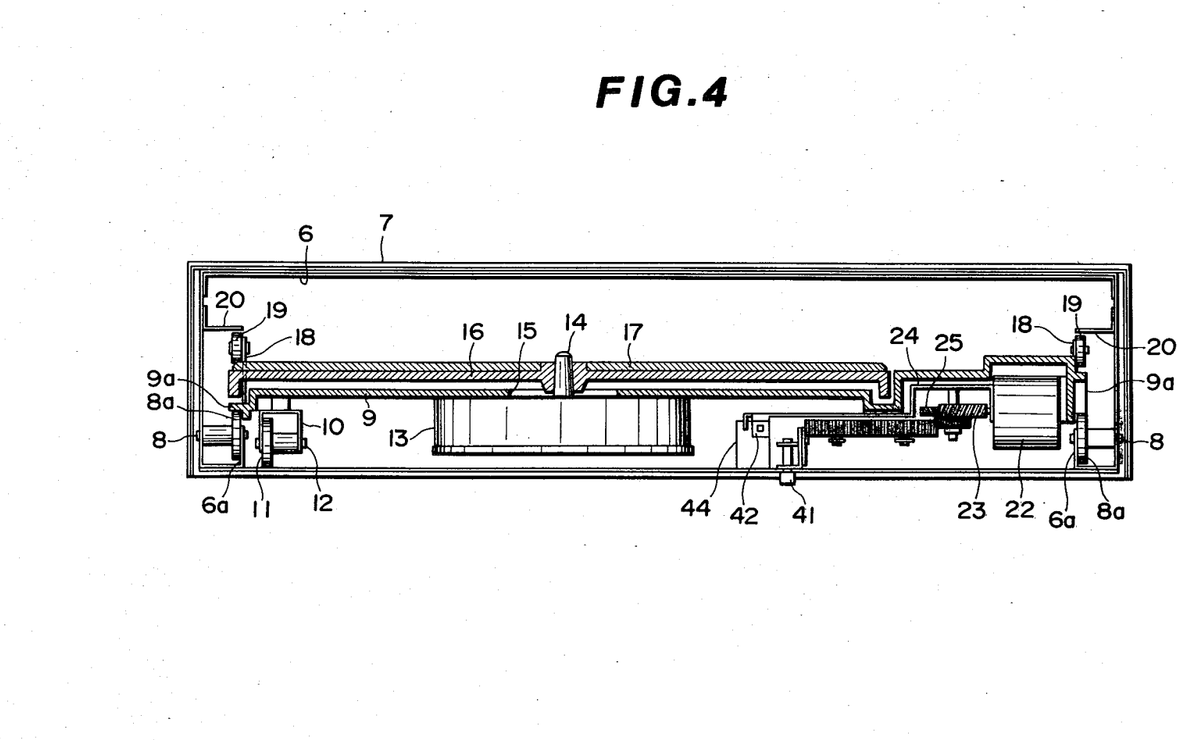
FIG. 4 is a front sectional view of a portion of the apparatus shown in FIG. 3.

Turning now to FIGS. 3 and 4, portions of the record player are illustrated in greater detail; and, in particular, the structure which comprises and drives carrier 1 is illustrated. As shown in FIG. 4, housing 2 is comprised of an inner case 6 having, for example, top, bottom, side and rear walls, and is open to the front of the record player. The outer surfaces of at least some of the walls of inner case 6 are provided with a decorative panel 7. A pair of brackets 6a (FIG. 4) is provided at opposite sides of the front portion of inner case 6. Rotatable shafts 8 are supported in brackets 6a, and guide rollers 8a are mounted on these shafts so as to be rotatable. Carrier 1 includes a player board 9 having left and right guide rails 9a, each guide rail being guided by a respective one of guide rollers 8a.

Player board 9 supports a turntable motor 13 whose drive shaft is coupled to and, preferably, is integral with a spindle 14. This spindle extends upwardly through an aperture 15 provided in player board 9. Spindle 14 is secured to turntable 16 upon which a mat 17 is provided to support a record placed thereon.

At the rear of player board 9, as viewed in FIG. 4, there are provided, at opposite sides, that is, at the left side and right side of the player board, brackets 10 (only the left bracket being shown in FIG. 4) which support shafts 12 upon which guide rollers 11 are mounted. Guide rollers 11 support player board 9 on the bottom wall of inner case 6. Thus, the combination of guide rollers 8a and 11 permit player board 9 to be moved into and out of inner case 6. Furthermore, the arrangement of these guide rollers maintains the player board in a substantially horizontal plane during this movement.

In addition to brackets 10, a pair of brackets 18 is mounted at the rear portion of player board 9, one of brackets 18 being mounted on the left side of the player board and the other bracket being mounted on the right side thereof, as illustrated in FIG. 4. A guide roller 19 is rotatably supported in each of brackets 18. Each of a pair of guide rails 20 is mounted on a respective side wall of inner case 6, as illustrated, and these guide rails serve to guide rollers 19. Guide rails 20 prevent upward displacement of player board 9, thereby maintaining the player board in the aforementioned substantially horizontal plane during withdrawal and retraction thereof.

A mounting plate 24, having the configuration illustrated in FIG. 4, is secured to the underside of player board 9 and has coupled thereto a carrier drive motor 21 and a tone arm drive motor 22. Drive motor 21 is bi-directionally operable to drive the carrier 1 into and out of inner case 6. Drive motor 22 is bi-directionally operable to raise and lower tone arm T-A with respect to a record placed upon turntable 16; and to pivot the tone arm in the clockwise and counterclockwise directions. In particular, tone arm T-A is mechanically coupled to a gear 30 (FIG. 3), and the gear is bi-directionally rotated to pivot the tone arm radially inward and outward, respectively, relative to a record disc. Drive motor 22 is mechanically coupled to gear 30 via a mechanical arrangement which includes a worm gear 23 mounted on the shaft of motor 22, and a gear train comprised of gears 25, 26, 27, 28 and 29 which intercouple worm gear 23 with gear 30, as illustrated in FIG. 3. An additional mechanical arrangement (not shown) is provided such that, when drive motor 22 is energized, tone arm T-A is lowered onto a record after being moved through the lead-in portion; and when drive motor 22 is energized in the opposite direction, the tone arm is raised from the record prior to the rotation of gear 30 to return the tone arm to its reset position. Thus, motor 22 cooperates with this mechanical arrangement, as well as with the illustrated gear train, to carry out a lead-in operation of the tone arm as well as a lead-out operation thereof. One embodiiment of the aforementioned mechanical arrangement whereby motor 22 is used to raise and lower the tone arm as well as to pivotally drive the tone arm is described in Japanese Patent Application No. 123906/1979, which has been laid open to public inspection.

Carrier drive motor 21 is coupled, via a worm gear 31 mounted on the shaft thereof, to a gear train comprised of gears 32, 33, 34 and 35, as illustrated in FIG. 3. Bi-directional energization of drive motor 21 serves to drive gear 35 in the clockwise and counterclockwise directions, respectively. Gear 35 cooperates with a rack 36 which is mechanically coupled to the bottom wall of inner case 6 and, thus, is relatively fixed with respect to this gear. In particular, rack 36 is mounted on a lever or arm 38 having one end pivotally secured to the bottom wall of inner case 6 by a pivot pin 37, and having its other end coupled to the bottom wall of the inner case by a bias arrangement including a bias spring 40, as illustrated in FIG. 3. Spring 40 is disposed within a cavity 39 provided on the bottom wall of inner case 6, and this spring exerts a bias force against a pin 41 which passes through the front end of arm 38, as illustrated. A projection 36a, provided at the front end of rack 36, is coupled to spring 40. It is appreciated that the spring, in the arrangement illustrated in FIG. 3, supplies a spring bias force to arm 38 so as to urge the arm, together with rack 36 mounted thereon, in the counterclockwise direction. Thus, gear 35 is in close meshing engagement with rack 36. As gear 35 rotates in the clockwise direction, the gear, together with plate 24, secured thereto and player board 9 attached to the plate, advance relative to rack 36 so as to withdraw the player board from housing 2. Conversely, when gear 35 rotates in the counterclockwise direction, plate 24 and player board 9 move in the rearward direction, relative to rack 36, thereby retracting the player board into housing 2. As shown in FIGS. 3 and 4, drive motors 21 and 22, as well as their respective gear train transmissions, are coupled to plate 24 so as to be movable therewith. Of course, since plate 24 is mounted on the underside of player board 9, as shown in FIG. 4, any movement of the plate is translated into corresponding movement of the player board. The aforementioned guide rollers 8a, 11 and 19 serve to guide the player board into and out of housing 2, insuring that the player board is maintained in its proper horizontal disposition.

A pair of limit switches 42 and 43 are mounted on a projection 24a of plate 24 and, as shown in FIG. 3, these limit switches depend from the underside of the plate. Limit switch 42 is provided with a movable armature 42a and, similarly, limit switch 43 is provided with a movable armature 43a. Armature 42a is adapted to contact a stop member 44, fixedly secured to the bottom wall of inner case 6, when player board 9 has been fully retracted within the inner case. In similar fashion, armature 43a is adapted to contact stop member 45, also secured to the bottom wall of inner case 6, when the player board has been fully withdrawn from its housing. Armatures 42a and 43a are mechanically coupled to electromechanical switches, as will be described, so as to actuate such switches when the respective armatures contact stop members 44 and 45. In this manner, control circuitry, to be described below, is provided with indications that player board 9 and, thus, carrier 1, is in its withdrawn or retracted position.

Figure 5:
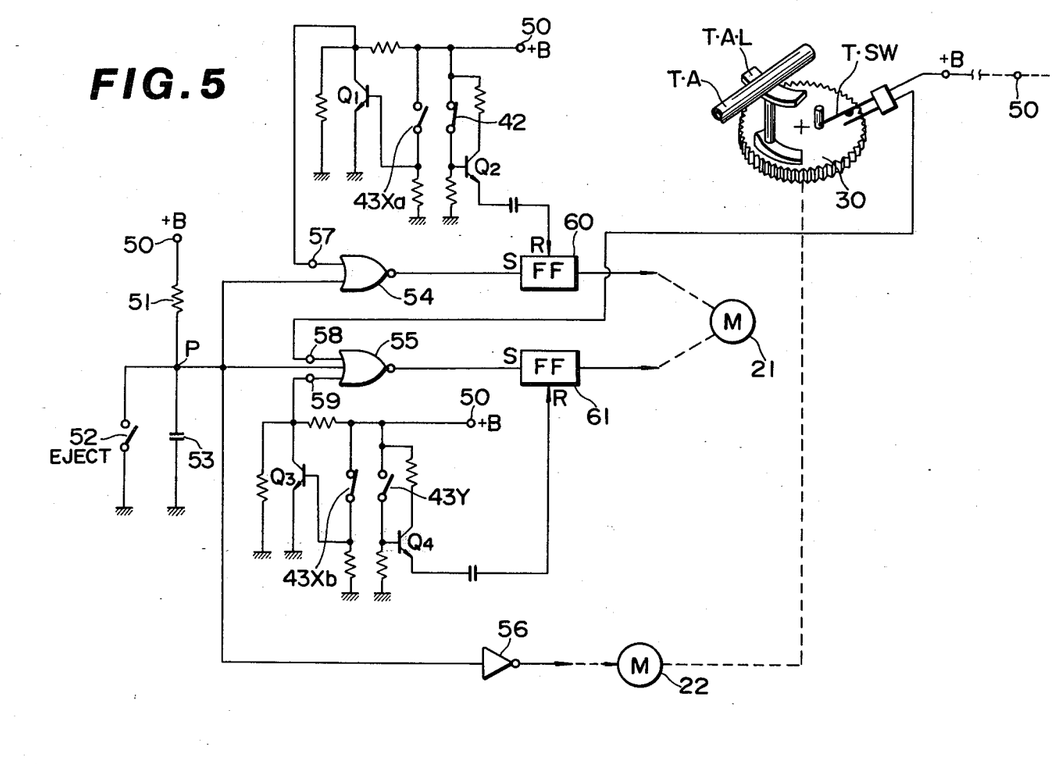
FIG. 5 is a schematic diagram of the drive control circuit of the eject apparatus, in accordance with the present invention.

The manner in which the mechanical drive arrangement shown in FIGS. 3 and 5 operates now will be briefly described. Let it be assumed that carrier 1 is in its retracted position. Upon the actuation of a selected one of switches 46, such as the EJECT switch, drive motor 21 is energized to rotate the gear 35 in the clockwise direction, thereby advancing player board 9 from its retracted position to its withdrawn position. When armature 43a of limit switch 43 contacts stop member 45, drive motor 21 is deenergized such that player board 9 is stopped in its fully withdrawn position. A record disc then may be placed upon or removed from turntable 6. Then, when a new record has been loaded onto the turntable, or if the turntable is "empty" as desired, the same EJECT switch 46, or alternatively, a LOAD switch 46, is actuated to energize drive motor 21 in the opposite direction. Gear 35 thus rotates in the counterclockwise direction so as to return player board 9 to its retracted position. When armature 42a of limit switch 42 contacts stop member 44, motor 21 is deenergized, thereby stopping the player board in its fully retracted position.

Once the player board and turntable mounted thereon have been fully retracted, a record play back operation may commence. This is achieved by rotating turntable motor 13 and by energizing tone arm drive motor 22. The energization of motor 22 rotates gear 30 so as to pivot the tone arm from its reset position to its lead-in position. Thereafter, the mechanical arrangement which raises and lowers the tone arm operates to lower the tone arm onto the surface of the record disc. The tone arm thus is driven through its lead-in operation. At the end of the lead-in operation, gear 30 disengages from gear 29, as by a notch that may be provided on either one of these gears. The tone arm then is free to pivot in response to the force exerted thereon by the stylus which rides in the usual sound groove of the record disc. Thus, the sound signals recorded in the disc are played back. When the playback operation ends, drive motor 22 is energized to raise the stylus of the disc; and, thereafter, gear 29 engages gear 30 to pivot the tone arm in the counterclockwise direction and return it to its reset position. When this reset position is attained, suitable sensing circuitry operates to deenergize drive motor 22.

As will now be described, carrier drive motor 21 may be energized to withdraw carrier 1 from housing 2 concurrently with the energization of tone arm drive motor 22, the latter functioning to return the tone arm from an intermediate position, reached during playback, to its reset position. The control circuitry which is used to selectively energize the carrier and tone arm drive motors is illustrated in FIG. 5. This circuitry is comprised of a retract gate 54, a withdraw gate 55, a retract flip-flop circuit 60, a withdraw flip-flop circuit 61 and a delay circuit including a resistor 51 and a capacitor 53 connected as an RC time delay circuit. Retract gate 54 is illustrated as a NOR gate having its output connected to a set input of flip-flop circuit 60 and having one of its inputs connected to junction P defined by the connection of resistor 51 and capacitor 53 of the delay circuit. The other input of NOR gate 54 is connected to a terminal 57 which, in turn, is coupled to a sense circuit that includes a normally open contact 43Xa of limit switch 43, which contact 43Xa is adapted to be closed when armature 43a contacts stop 45 (FIG. 3) when carrier 1 is fully withdrawn from housing 2. This sense circuit includes a power supply terminal 50 adapted to be supplied with a positive DC operating potential $+B$, and a transistor $Q_1$ whose base electrode is supplied with the operating potential when contact 43Xa is closed. The collector electrode of transistor $Q_1$ is coupled to power supply terminal 50 via a resistor and, in addition, this collector electrode is connected to terminal 57 so as to supply a relatively low level potential thereto when contact 43Xa is closed. It is appreciated that, when contact 43Xa is open, transistor $Q_1$ is non-conductive, such that the collector electrode thereof supplies a relatively high level potential signal to terminal 57.

The sense circuit also includes the switch contact 42 of limit switch 42 (FIG. 3), which switch 42 is adapted to be closed when armature 42a contacts stop 44, thus detecting when carrier 1 is fully retracted within housing 2. Switch 42 is coupled to the base electrode of a transistor $Q_2$ whose collector electrode is coupled to power supply terminal 50 by a resistor, and whose emitter electrode is coupled to the reset input of flip-flop circuit 60 by a capacitor. It is appreciated that, when switch 42 is closed, transistor $Q_2$ is rendered conductive so as to supply a reset pulse to flip-flop circuit 60 representing the closure of switch 42. The output of flip-flop circuit 60 is coupled to a motor control circuit represented by the broken line extending from the output of this flip-flop circuit to drive motor 21. When flip-flop circuit 60 admits of its set state, motor 21 is energized in one direction to drive gear 35 in the counterclockwise direction such that plate 24, together with player board 9, rides along rack 36 in the rearward direction, thereby retracting carrier 1 into housing 2. Motor 21 is deenergized when flip-flop circuit 60 is reset.

Withdraw gate 55 is illustrated as a three-input NOR gate having one input coupled to junction P, another input coupled to a terminal 58 and its third input coupled to a terminal 59. Terminal 58 is connected to a tone arm position detector switch TSW which is adapted to detect when tone arm T-A is in its lowered position, wherein the stylus is in contact with the surface of the record disc, and to detect when the tone arm is in its raised position. As mentioned above, a mechanical arrangement is driven by tone arm drive motor 22 to raise and lower the tone arm as well as to pivot the tone arm in the generally radial direction of the phonograph record which is played back thereby. This mechanical arrangement which is used to raise and lower the tone arm is diagrammatically illustrated as a tone arm lifter TAL which rides upon a cam that is shown, for purposes of simplification and description, as being mounted on gear 30. Gear 30 also is illustrated as having a pin that rotates with the gear and is adapted to engage the switch contacts of tone arm position detector switch TSW. FIG. 5 thus schematically represents that tone arm position detector switch TSW is closed when tone arm T-A is in its lowered position, and this switch is opened when the tone arm is raised from the surface of the phonograph record, such as when tone arm lifter TAL rides up on the surface of the illustrated cam when gear 30 rotates. The tone arm position detector switch is coupled to power supply terminal 50 such that, when this switch is closed, that is, when tone arm T-A is in its lowered position so that the stylus is in contact with the surface of the phonograph record, a relatively high level potential is supplied to terminal 58. Conversely, when tone arm T-A is raised, tone arm position detector switch TSW is opened to supply a relatively low level potential signal to terminal 58, thus representing that the stylus no longer is in contact with the surface of the phonograph record.

Terminal 59, which is coupled to the third input of NOR gate 55, is connected to a sense circuit similar to the aforedescribed sense circuit, including a contact 43Xb of limit switch 43 and a transistor $Q_3$. Contact 43Xb is adapted to be closed when carrier 1 is fully retracted within housing 2. This contact connects the base electrode of transistor $Q_3$ to power supply terminal 50 such that, when contact 43Xb is closed, that is, when carrier is in its retracted position, the operating potential +B is supplied to the base electrode of transistor $Q_3$, thus rendering this transistor conductive. The collector electrode of transistor $Q_3$ is coupled via a resistor to power supply terminal 50 and, in addition, is coupled to terminal 59. Thus, when transistor $Q_3$ is rendered conductive, the collector electrode thereof supplies a relatively low level potential signal to terminal 59, thus indicating that carrier 1 is in its retracted position.

The output of NOR gate 55 is coupled to the set input of flip-flop circuit 61. This flip-flop circuit is coupled to the aforementioned motor control circuit for selectively energizing carrier drive motor 21. It will be appreciated that, when flip-flop circuit 61 admits of its set state, motor 21 is energized such that gear 35 is driven in the clockwise direction, whereby plate 24 and player board 9 ride along rack 36 so as to withdraw the carrier from its housing. When the flip-flop circuit 61 is reset, motor 21 is deenergized.

A reset circuit, similar to the aforedescribed reset circuit coupled to flip-flop circuit 60, is coupled to the reset input of flip-flop circuit 61. This reset circuit includes a contact 43Y, included in limit switch 43, and a transistor $Q_4$. Contact 43Y is adapted to be closed when armature 43a of limit switch 43 contacts stop 45, thereby indicating that carrier 1 is in its fully withdrawn position. The closure of contact 43Y supplies the operating potential +B to the base electrode of transistor $Q_4$, thereby rendering this transistor conductive. It is seen that the collector electrode of transistor $Q_4$ is coupled, via a resistor, to power supply terminal 50; and the emitter electrode of this transistor is coupled by a capacitor to the reset input of flip-flop circuit 61. Hence, when contact 43Y closes so as to render transistor $Q_4$ conductive, a pulse is supplied to the reset input of flip-flop circuit 61.

As illustrated in FIG. 5, a switch contact 52 of, for example, EJECT switch 46, is connected in parallel with capacitor 53. The EJECT switch may be of the so-called momentary contact type whereby contact 52 closes momentarily in response to the actuation of the EJECT switch. Alternatively, the EJECT switch may be a typical spring-biased switch which remains closed only for so long as an operator actuates the switch, and thereafter, when the switch is released, contact 52 opens. It is recognized that, regardless of the actual construction of the EJECT switch, the closure of contact 52 serves to discharge capacitor 53. When this contact opens, a charging current flows from power supply terminal 50 through resistor 51 to charge capacitor 53. The rate at which the capacitor is charged, that is, the time delay of the illustrated delay circuit, is determined by the usual RC time constant.

Junction P additionally is coupled, via an inverter 56, to the drive motor control circuitry (not shown) which is used to control the energization of tone arm drive motor 22. This drive motor control circuitry is represented by the broken line which extends from inverter 56 to motor 22. It will be appreciated that tone arm drive motor 22 is energized in response to a relatively high level signal produced at the output of inverter 56 which, in turn, means that the tone arm drive motor is energized for so long as a relatively low level signal is supplied to the inverter. This low level signal is produced in response to the closure of EJECT switch contact 52, which discharges capacitor 53, and which remains present for a duration determined by the RC time constant of the illustrated delay circuit. That is, motor 22 is energized for at least a predetermined time in response to the actuation of the EJECT switch.

The manner in which the illustrated control circuitry operates now will be described. Let it be assumed, initially, that carrier 1 is withdrawn from housing 2 to permit the removal of a phonograph record from turntable 16 and, if desired, to load a new record on that turntable. When the carrier is in its withdrawn position, armature 43a of limit switch 43 is in contact with stop 45, thereby closing contact 43Xa and opening contact 43Xb. Since contact 43Xa is closed, transistor $Q_1$ is rendered conductive to supply a relatively low potential to terminal 57 of NOR gate 54. Conversely, since contact 43Xb is open, transistor $Q_3$ is rendered non-conductive so as to supply a relatively high level potential to terminal 59 of NOR gate 55. Accordingly, NOR gate 54 is conditioned to respond to the closure of contact 52, whereas NOR gate 55 is inhibited.

Now, when contact 52 is closed, as by the operation of the EJECT switch or a separate LOAD switch, capacitor 53 is discharged rapidly, and a relatively low potential is produced at junction P. This low potential is supplied to the other input of NOR gate 54 which, in response to the low potential signal supplied to each input thereof, produces a relatively high potential set signal. Consequently, flip-flop circuit 60 is set to energize carrier drive motor 21 in the direction such that the carrier is retracted into housing 2.

The relatively low potential produced at junction P also is inverted by inverter 56 and tends to energize tone arm drive motor 22. However, at this time, it is assumed that tone arm T-A is in its reset position and, therefore, the relatively high potential signal now produced at the output of inverter 56 has no effect on the tone arm drive motor.

Carrier drive motor 21 remains energized so as to continue to drive the carrier into the housing. It is appreciated that, after the actuation of the EJECT switch, contacts 52 open and capacitor 53 is charged via resistor 51. Hence, the voltage across this capacitor gradually increases until the potential at junction P is of a sufficiently high level to inhibit NOR gate 54. Nevertheless, flip-flop circuit 60 remains in its set state to continue the energization of motor 21.

When the carrier reaches its retracted position within housing 2, armature 42a of limit switch 42 contacts stop 44 so as to close contact 42 (FIG. 5). This closure of contact 42 renders transistor $Q_2$ conductive so as to supply a reset pulse through the illustrated capacitor to flip-flop circuit 60. This flip-flop circuit thus is reset so as to deenergize carrier drive motor 21. The carrier thus remains in its retracted position.

It will be appreciated that, when armature 43a is removed from stop 45, contact 43Xa opens so as to render transistor $Q_1$ non-conductive. Hence, when the carrier is not in its fully withdrawn position, a relatively high potential signal is supplied by the non-conductive transistor $Q_1$ to terminal 57, thereby inhibiting NOR gate 54.

When carrier 1 is retracted within housing 2, a phonograph record loaded upon turntable 16 may be played back. Let it be assumed that during this playback operation, the user desires to withdraw the carrier from its housing to remove or replace the phonograph record then loaded on the turntable. This is achieved by operating the EJECT switch which, as described above, closes contact 52 so as to discharge capacitor 53. Hence, a relatively low potential signal is produced at the junction P and is supplied to NOR gate 55. As mentioned above, this low potential signal also is supplied to NOR gate 54; however, since NOR gate 54 now is inhibited by reason of the non-conduction of transistor $Q_1$, this NOR gate does not respond to the relatively low level potential signal supplied thereto.

Since the carrier is in its retracted position, contact 43Xb of limit switch 43 is closed. Hence, transistor $Q_3$ is rendered conductive so as to supply a relatively low level potential signal to terminal 59 of NOR gate 55. However, NOR gate 55 does not respond to the respective low level potential signals supplied to the inputs thereof unless tone arm T-A is in its raised position. In accordance with the example presently described, it has been assumed that, at the time that contact 52 is closed, tone arm T-A is in its lowered position. Tone arm position detector switch TSW detects this lowered position of the tone arm, and the contacts of the tone arm position detector switch are closed to indicate that the tone arm is in its lowered position. Consequently, at the time that contact 52 is closed, a relatively high level potential signal is supplied to terminal 58 of NOR gate 55 from power supply terminal 50 through the closed contacts of tone arm position detector switch TSW. Therefore, NOR gate 55 is inhibited from responding to the closure of contact 52 while tone arm T-A is in its lowered position.

However, the closure of contact 52 supplies a relatively low level potential signal from junction P to inverter 56. The inverter inverts this low level potential signal to supply a relatively high level potential signal for energizing tone arm drive motor 22. Consequently, motor 22 operates the mechanical arrangement by which tone arm T-A is raised, thereby opening the contacts of tone arm position detector switch TSW. In addition, the energization of motor 22 drives gear 30 so that, in addition to raising tone arm T-A from its lowered position, gear 30 rotates to pivot the tone arm toward its reset position.

The opening of the contacts of tone arm position detector switch TSW supplies a relatively low level potential signal therefrom to terminal 58 of NOR gate 55. Consequently, at this time, a relatively low level potential signal is supplied to each of the inputs of this NOR gate, thereby producing a relatively high level set signal to set flip-flop circuit 61. This flip-flop circuit thus energizes carrier drive motor 21 such that this motor rotates in a direction to withdraw carrier 1 from housing 2. When the carrier is fully withdrawn, armature 43a of limit switch 43 contacts stop 45 so as to close contact 43Y. This, in turn, renders transistor $Q_4$ conductive so as to supply a reset pulse via the illustrated capacitor to reset flip-flop circuit 61. Hence, carrier drive motor 21 now is deenergized to maintain the carrier in its withdrawn position.

As discussed above, after the EJECT switch is actuated, contact 52 closes momentarily and then opens so as to permit capacitor 53, after being discharged, to charge gradually through resistor 51. When the voltage across the capacitor reaches a sufficient level, NOR gate 55 is inhibited. However, flip-flop circuit 61 remains in its set state until the carrier is fully withdrawn, whereupon contact 43Y is closed to reset the flip-flop circuit.

When the carrier is in its withdrawn position, contact 43Xa is closed so as to condition NOR gate 54 to respond to the next closure of contact 52; and contact 43Xb is opened so as to inhibit NOR gate 55 from responding thereto. Thus, the illustrated control circuitry admits of the initial condition, awaiting the next closure of contact 52 to energize carrier drive motor 21 so as to retract the carrier within housing 2, as described hereinabove.

From the foregoing description, it is seen that the control circuitry of FIG. 5 energizes drive motors 21 and 22 concurrently such that carrier 1 is withdrawn from housing 2 while tone arm T-A is returned to its reset position. To avoid movement of the carrier while the stylus of the tone arm is in contact with the phonograph record, the energization of carrier drive motor 21 is inhibited until the tone arm is raised, as detected by tone arm position detector switch TSW. Of course, if the tone arm is already is in its raised position at the time that the EJECT switch is actuated, such as if a REJECT switch is operated immediately prior to the operation of the EJECT switch, carrier drive motor 21 will be energized immediately upon the operation of the EJECT switch.

While the present invention has been particularly shown and described with reference to a preferred embodiment thereof, various changes and modifications in form and details may be made without departing from the spirit and scope of the invention. For example, sensors other than electromechanical limit switches may be used to sense when the carrier is in its withdrawn and retracted positions, respectively. Likewise, a sensor other than the illustrated tone arm position detector switch may be used to sense when the tone arm is in its lowered and raised positions. Furthermore, sense circuits other than those specifically illustrated in FIG. 5 may be used to condition NOR gates 54 and 55 to respond to the closure of contact 52, depending upon whether carrier 1 is sensed to be in its withdrawn or retracted position. Still further, NOR gates 54 and 55 may be replaced by AND gates to supply equivalent set signals to flip-flop circuits 60 and 61, respectively. The EJECT switch may be of the momentary contact type, as described above, or may be a simple spring-biased switch whose contacts remain closed so long as the switch is operated by the user. Also, a flip-flop circuit may be used to energize tone arm drive motor 22. Alternatively, a monostable multivibrator, or a one-shot circuit, may be used to energize this motor.

It is intended that the appended claims be interpreted as including the foregoing as well as various other changes and modifications.

What is claimed is:

1. In a record player of the type having a housing, a carrier movable into and out of said housing, a turntable mounted on said carrier and a tone arm pivotably supported on said carrier and movable between a raised position and a lowered position; apparatus comprising:

carrier drive means energizable to bi-directionally drive said carrier into and out of said housing between withdrawn and retracted positions, respectively;

sense means for sensing when said carrier is in its withdrawn and retracted positions, respectively;

tone arm drive means energizable to pivotally drive said tone arm to and from a reset position;

tone arm position detecting means for detecting when said tone arm is in its raised and lowered positions, respectively;

switch means for initiating a carrier movement operation; and drive control means responsive to said switch means to energize said carrier drive means in accordance with the position sensed by said sense means, whereby said carrier drive means drives said carrier into said housing when said sense means senses that said carrier is in its withdrawn position, and said carrier drive means drives said carrier out of said housing when said sense means senses that said carrier is in its retracted position and said tone arm position detecting means detects that said tone arm is in its raised position; said drive control means concurrently energizing said tone arm drive means to pivot said tone arm to its reset position.

2. The apparatus of claim 1 wherein said drive control means comprises retract gate means coupled to said switch means and to said sense means for producing a retract signal when said switch means is operated and said sense means senses that said carrier is in its withdrawn position; withdraw gate means coupled to said switch means, said sense means and said tone arm position detecting means for producing a withdraw signal when said switch means is operated, said sense means senses that said carrier is in its retracted position, and said tone arm position detecting means detects that said tone arm is in its raised position; and means for applying said retract and withdraw signals to said carrier drive means to drive said carrier into and out of said housing, respectively.

3. The apparatus of claim 2 wherein said means for applying said retract and withdraw signals comprises retract and withdraw bistate means, respectively, said retract bistate means being set to energize said carrier drive means to drive said carrier into said housing in response to said retract signal and said withdraw bistate means being set to energize said carrier drive means to drive said carrier out of said housing in response to said withdraw signal; and reset means for resetting said retract bistate means when said sense means senses that said carrier is in its retracted position and for resetting said withdraw bistate means when said sense means senses that said carrier is in its withdrawn position.

4. The apparatus of claim 3 wherein said sense means comprises limit switch means actuated when said carrier is in its withdrawn position and actuated when said carrier is in its retracted position, respectively.

5. The apparatus of claim 4 wherein said limit switch means supplies a substantially constant level signal to said retract gate means when said limit switch means is actuated by said carrier being in its withdrawn position so as to enable said retract gate means to respond to the operation of said switch means; and wherein said limit switch means supplies a substantially constant level signal to said withdraw gate means when said limit switch means is actuated by said carrier being in its retracted position so as to enable said withdraw gate means to respond to the operation of said switch means and said tone arm position detecting means.

6. The apparatus of claim 4 further comprising means responsive to the actuation of said limit switch means when said carrier reaches its retracted position to supply a pulse signal for resetting said retract bistate means; and means responsive to the actuation of said limit switch means when said carrier reaches its withdrawn position to supply a pulse signal for resetting said withdraw bistate means.

7. The apparatus of claim 1 wherein said drive control means further comprises delay means responsive to the operation of said switch means for energizing said tone arm drive means for a predetermined time to drive said tone arm to said reset position.

8. The apparatus of claim 7 wherein said delay means comprises charging means that is discharged in response to the operation of said switch means so as to energize said tone arm and drive means and then is charged following the operation of said switch means, said charging means being charged over a predetermined period of time to a level sufficient to deenergize said tone arm drive means.

9. The apparatus of claim 8 wherein said charging means comprises an RC circuit formed of a resistor connected in series with a capacitor, said switch means being coupled in parallel with said capacitor and said capacitor being charged through said resistor, and means for energizing said tone arm drive means as a function of the voltage across said capacitor.

10. The apparatus of claim 1 wherein said tone arm position detecting means comprises a switch for producing a withdraw enable signal when said tone arm is in its raised position to condition said drive control means to energize said carrier drive means to drive said carrier out of said housing.

* * * * *